April 8, 1941.  R. M. ROATH  2,237,504
SEED DISPERSER
Filed Dec. 12, 1938
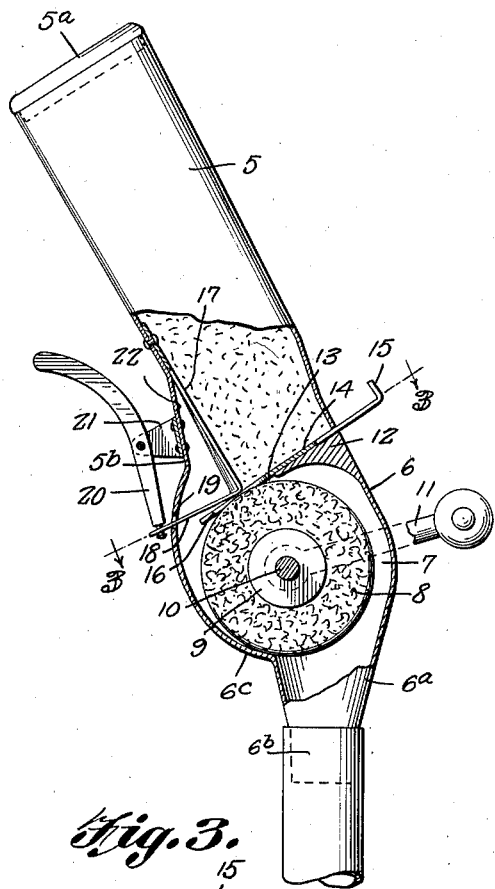
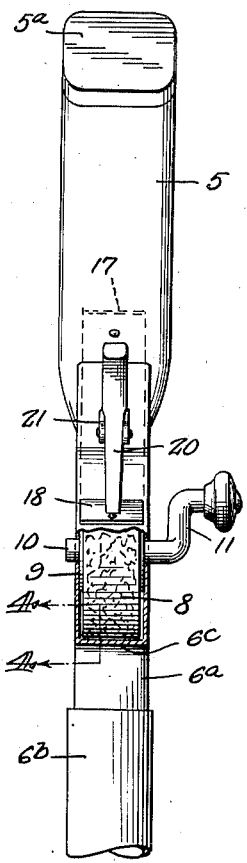
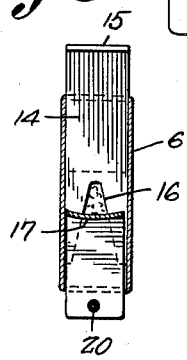
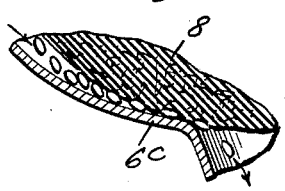
Royce M. Roath, INVENTOR
BY Victor J. Evans & Co.
ATTORNEYS Patented Apr. 8, 1941

2,237,504

UNITED STATES PATENT OFFICE 2,237,504

SEED DISPERSER

Royce M. Roath, Earlville, Ill.

Application December 12, 1938, Serial No. 245,307

1 Claim. (Cl. 221—119)

My invention relates to seed dispersers and has as one of the principal objects thereof the provision of a seed disperser equipped with means for effectively discharging seeds from a hopper of the device together with means for regulating the amount of seed discharged therefrom during the operation of the device.

Another object of my invention is to provide a device of the character described equipped with manually control means for governing the amount of seed dispersed from said device.

A further object of my invention is to provide a device of the character described which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a side elevation of my invention partly in section.

Figure 2 is an end elevation thereof partly in section.

Figure 3 is a detail sectional view taken on the line 3—3 of Figure 1.

Figure 4 is a detail sectional view taken on the line 4—4 of Figure 2 and on an enlarged scale.

In the selected embodiment of my invention illustrated in the drawing my novel form of seed disperser comprises a hopper 5 of a pistol-grip configuration, the lower end of which is integrally connected to the upper end of a roller housing 6 fashioned with a chamber 7 in which is positioned a feed roller 8, the latter being constructed of yieldable material, for instance sponge rubber or the like.

The upper end of the hopper 5 is closed by a plug 5a removable therefrom to effect filling of the hopper with seed. The lower end of the housing 6 is fashioned with a subjacently extending section 6a to which is secured the upper end of a tube 6b through which seed is dispersed for planting.

The roller 8 is so arranged in the housing as to yieldably engage the lower portion of an end wall 6c of said housing adjacent the section 6a during rotation of the roller for a purpose hereinafter set forth. The roller is fashioned with a non-yieldable hub 9 fixed to a shaft 10 extending therethrough and having ends journaled for rotation in bearing openings formed in the side walls of the housing. One end of the shaft 10 is fashioned with a crank arm 11 whereby said feed roller is manually rotated within the housing.

The upper end of the housing, subjacent the hopper, is fashioned with a partition 12 coacting with the walls of the casing to define a discharge port 13 effecting communication between the hopper and housing. The discharge port 13 is arranged laterally of the axis of the hopper 5 and towards the end wall 6c as clearly illustrated in Figure 1.

Slidably mounted on the upper face of the partition 12 is a slide 14 controlling the port 13. One end of said slide extends through a slot formed in the wall of the hopper adjacent the partition 12 and terminates in a right angularly disposed finger piece 15 to facilitate adjustment of said slide. The opposite end of said slide is fashioned with an inwardly extending cuneiform slot 16 adapted for controlling the amount of seed discharged therethrough into the housing.

A lower end section 5b of the hopper is disposed outwardly for integral connection with the wall 6c and has fixed thereto the upper end of a resilient member or leaf spring 17, the lower end 17a of which is fashioned with a right angular disposed section 18 extending outwardly through a slot 19 formed in the housing and has connected thereto the lower end of a trigger 20 pivotally mounted in a bracket 21 fixed to the lower end section of said hopper.

The lower end section 5b of the hopper, which is downwardly and outwardly inclined, forms a seat or abutment 22 to limit the outward movement of the member 17 when actuated by the trigger 20. The inner face of the member 17 is normally disposed in a plane intersecting the axis of the roller 8 and the lower end of said member has sliding engagement with the upper face of the slide 14.

In use, the hopper being filled with seed, the slide 14 is adjusted to regulate the amount of seed to be discharged through the slot 16 into the housing and the trigger is operated to move the member 17 in an outward direction to permit said seed to be discharged into the housing through the slot 16 and gravitate between the roller and wall 6c. When the seeds are thus discharged between the roller and wall 6c, the yieldable roller functions to receive the seeds in the peripheral face thereof and feed them into the section 6a for discharge through the tube 6b.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation which are capable of extended application in advance forms, and that the invention comprehends all construction within the scope of the appended claim.

What I claim is:

A device comprising a hopper having a discharge port, a housing connected to said hopper and open to said port, said housing fashioned with an outlet opening, an apertured slide adjustably mounted in the housing for regulating the effective size of said port, a yieldable roller mounted in said housing and coacting with a wall of the latter for feeding seed, introduced into said housing through said port, into said outlet opening upon rotation of said roller, and a trigger actuated leaf spring carried by said hopper, and slidably engaging and coacting with said slide for permitting and precluding the discharge of seed through said slide and port.

ROYCE M. ROATH.